UNITED STATES PATENT OFFICE.

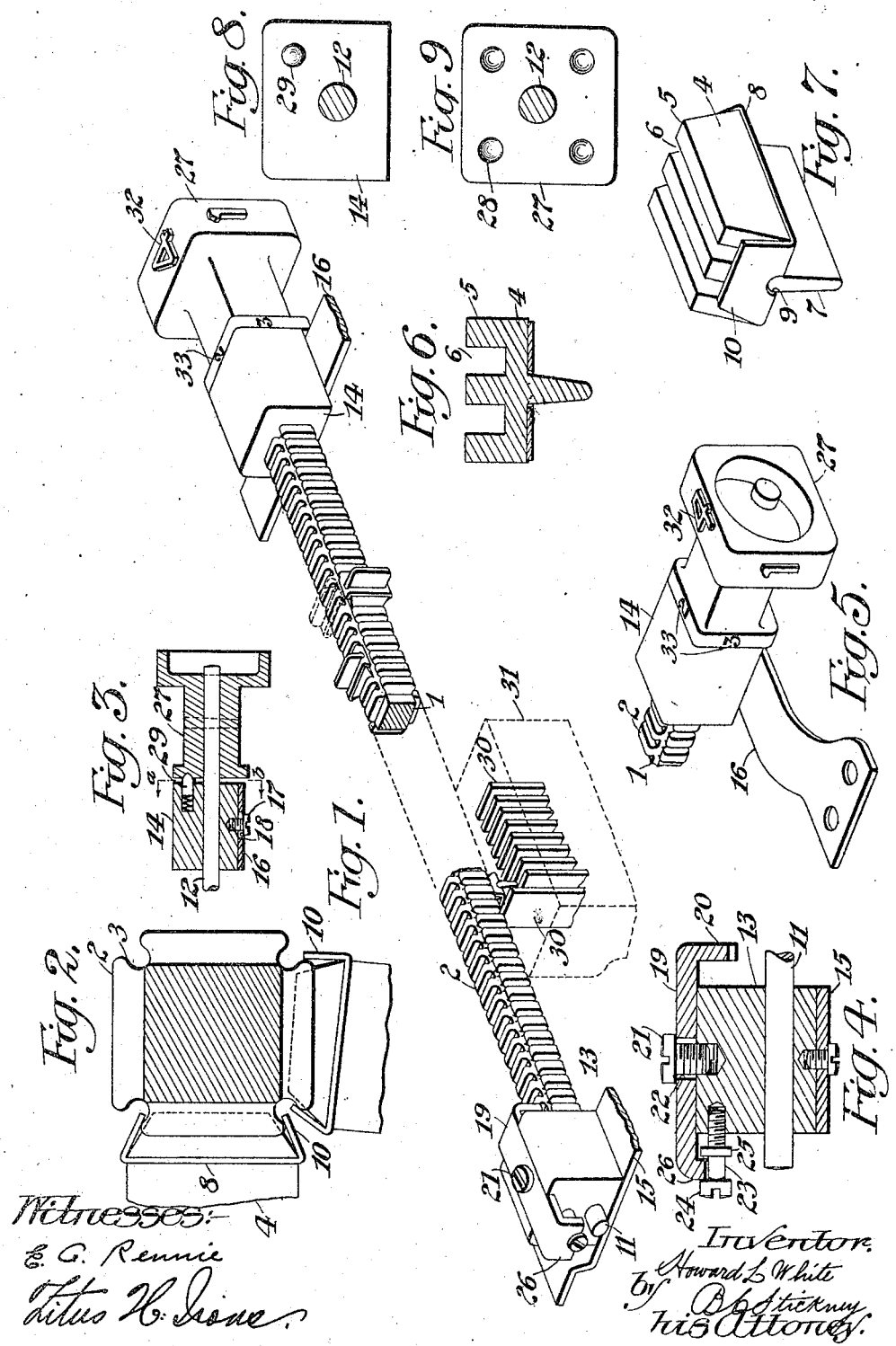

HOWARD L. WHITE, OF NEW YORK, N. Y., ASSIGNOR TO UNDERWOOD TYPEWRITER COMPANY, OF NEW YORK, N. Y., A CORPORATION OF DELAWARE.

TYPE-WRITING MACHINE.

1,158,608.   Specification of Letters Patent.   Patented Nov. 2, 1915.

Application filed October 1, 1913. Serial No. 792,701.

*To all whom it may concern:*

Be it known that I, HOWARD L. WHITE, a citizen of the United States, residing in Brooklyn borough, city of New York, in the county of Kings and State of New York, have invented certain new and useful Improvements in Type-Writing Machines, of which the following is a specification.

My invention relates to tabulating mechanism for typewriting machines, and particularly to a multiple rack bar of the kind adapted to carry several series of adjustable stops, enabling the tabulator to be used with a number of different work-forms with little or no readjustment of the stops.

A feature of the invention is the provision of an improved form of rack bar and stops, permitting the stops on each side of the rack bar to be adjusted to any position without possibility of interfering with any of the stops on the other sides of the rack bar.

A further feature of the invention is the provision of an improved form of stop which will be securely held in any position of adjustment, and will project from only one side of the rack bar, so as not to encroach on the field of the stops on the opposite or adjacent sides of the rack bar.

The rack bar is preferably square in cross-section, and provided on every side with a rack to hold a series of adjustable stops, each stop having a number of counter teeth or projections to enter between the rack teeth, to firmly hold the stops, and also having a tongue projecting from the outer side of the stop to coöperate with a counter stop on the typewriter. Each column stop carries a spring clip to engage flared ends of the rack teeth, each stop being supported solely by the teeth on one side of the rack bar, and not projecting into space in which the stops on other sides of the rack bar are adjustable.

The rack itself is journaled at or near its ends in blocks, which may be connected by brackets to the typewriter carriage, the rack being located over a series of counter stops on the machine frame, and rotatable to selectively bring the sets of stops into coöperative relation to the counter stops.

The rack is rotatable to bring any set of stops into operative position, by means of a turning head on the end of the rack, yieldably held by a spring detent. Indices on said head indicate which set of stops is in operative position, and also the sides of the rack bar on which the sets of stops are located.

The rack is adjustable longitudinally by means of an adjusting plate mounted on the bearing block, refinement of adjustment being obtained by an adjusting screw threaded into the bearing block and engaging said plate.

Other features and advantages will hereinafter appear.

Figure 1 is a perspective view of the mechanism. Fig. 2 is a cross sectional view on a larger scale. Fig. 3 is a sectional view showing the right-hand bearing block, and a turning head on the rack bar. Fig. 4 is a sectional view showing the left-hand bearing block, and a device for longitudinally adjusting the rack bar. Fig. 5 is a perspective view of parts shown in Fig. 3. Fig. 6 is a cross section of a stop. Fig. 7 is a perspective view of the same. Fig. 8 is a sectional view at the line $a$—$b$, Fig. 3, looking in the direction of the arrows. Fig. 9 is a view on the same section line, but looking in the opposite direction.

The rack bar 1 is preferably square in cross section, and is provided on each face with a set of rack teeth 2, the ends 3 of each tooth being inclined outwardly or flared so that the teeth are substantially dove-tailed in form. Each adjustable stop 4 comprises a body portion having projecting ribs 5 to enter the spaces between the rack teeth 2, said ribs being separated by spaces 6 substantially the width of the teeth. At the side opposite the ribs 5 is a tongue 7 adapted to project into position to be intercepted by a counter stop. Each stop 4 is held in position on the rack by a spring clip 8 formed with an opening 9 to fit over the tongue 7 and having ends 10 inclined inwardly to bear against the inclined ends of the stop. The spring clips 8, owing to their ends 10 being inclined inwardly, are retained on the stops when the latter are removed from the rack and securely held against accidental displacement.

Each stop is independently attached to the rack bar by first placing it in an inclined position with the ribs 5 between the rack teeth, as indicated at the lower part of Fig. 2, and then moving the stop endwise so that one of the ends 10 of the spring clip engages the ends of the teeth and is sprung outward sufficiently to allow the opposite end 10 to slip over the corresponding ends of the rack teeth, when the stop may readily be snapped into position. The ends 10 of the clip engaging the inclined ends 3 of the rack teeth, hold the stops firmly in position, and as the stop has a broad base extending over and engaging a number of rack teeth, and is firmly held, it forms a solid stop, and the tendency to tilt or yield when struck by a counter stop is reduced to a minimum, and fully compensated for. The strain is also distributed over a number of the rack teeth, as well as over the several ribs 5 of the stop. By reference to Fig. 2 it will be noted that each stop projects only from one side of the rack, and also that there is a clearance between the ends of the stops on adjacent sides of the rack bar, so that the stops on one rack cannot interfere with the adjustment of the stops on an adjacent rack. Thus, as shown on Fig. 1, and as is also evident from Fig. 2, stops may be placed on adjacent sides of the rack bar and in the same transverse plane.

The rack bar is provided with cylindrical ends or bearing spindles 11 and 12 journaled in bearing blocks 13 and 14 respectively, which blocks may be mounted on the typewriter carriage by means of brackets 15 and 16. The bracket 16 is adjustably secured to the block 14 by a screw 17 extending through an elongated slot 18 in the bracket and threaded into the block 14.

The rack bar is adjustable longitudinally to bring the stops into exact register with the counter stops at the normal stopping positions of the carriage, by means of an adjusting plate 19 mounted on the block 13 and having a depending end 20 to enter between the teeth on the rack bar. The plate 19 is secured in adjusted position by a set screw 21 extending through an enlarged opening 22 in the plate and threaded into the bearing block. An adjusting screw 23 threaded into the block 13 is provided with a head 24 and a collar 25 to engage a flange 26 on the adjusting plate, thereby permitting an accurate and fine adjustment of the rack bar. A turning head or hand wheel 27 keyed to the right-hand spindle 12 on the rack bar, has formed on its inner face a series of recesses 28 at angular distances of ninety degrees apart and at equal distances from the spindle 12, so that as the rack bar is rotated, the recesses or hollows 28 are brought into position to receive a spring detent 29 projecting from the bearing block 14. The rack teeth on each face of the rack bar are designed to receive a separate set of stops independently adjustable to positions corresponding to the columnar rulings of a work-sheet. As the rack bar is rotated, the several sets of stops are successively brought to a dependent position to coöperate with a counter stop or stops 30. As shown, the stops 30 comprise a series of decimal tabulator stops mounted in a casing 31 on the machine frame and adapted to be selectively projected by the usual mechanism, not shown, into position to intercept the column stops 4 on the rack bar.

The head 27 is preferably provided with a series of figures or other indicating characters 32 to indicate which set of column stops is in operative position. A second set of indicating characters 33 may also be provided on the head 27 to indicate the side of the rack bar carrying the stops which are correspondingly designated at 32. Thus, for example, as shown in Fig. 1, the character at 32 on the upper face of the head 27 and indicating the operative set of stops, is the figure "4," which figure in the series of characters 33 is placed on the side carrying said operative stops, that is, the under side of the head 27. Any change in the adjustment of said stops, which may be termed "set 4," may, therefore, readily be made by rotating the rack bar until the figure "4" on the series 33 appears at the upper side of the head 27, thus bringing the said set 4 into position for readjustment.

Variations may be resorted to within the scope of the invention, and portions of the improvements may be used without others.

Having thus described my invention, I claim:

1. In a tabulating mechanism, the combination of a rack bar having rack teeth on different faces, and stops removably connected to said rack and each projecting from only one face of the rack bar.

2. In tabulating mechanism, the combination with a rack bar having rack teeth on one face thereof, of a stop connected thereto and projecting only from said face.

3. In tabulating mechanism, the combination with a rack bar provided with rack teeth on adjacent faces thereof, of stops projecting from said faces and each adjustable to any position along the rack bar independently of the position of the stops on the adjacent face of the rack bar.

4. In tabulating mechanism, a rack bar formed with rack teeth on adjacent faces thereof, the adjacent ends of the rack teeth on said faces being cut away to provide space to accommodate holding clamps for stops mounted on the rack bar.

5. In tabulating mechanism, a rack bar having a series of rack teeth on each face thereof, the ends of said teeth being undercut to provide clearances extending longitudinally of the rack bar at the corners thereof, and leaving the ends of the teeth overhanging their base to provide holding means for stops on the rack.

6. In tabulating mechanism, a rack bar provided with a series of rack teeth on one face thereof, the ends of said teeth being outwardly inclined or flared, and stops adjustable on the rack and provided with means to engage said ends of the rack teeth.

7. In tabulating mechanism, a stop comprising a body portion, spaced ribs projecting from one face thereof to enter interdental spaces of a supporting rack, and a tongue projecting from the opposite face thereof, and in the opposite direction from said ribs to coöperate with a counter-stop, said ribs and tongue being perpendicular to said faces.

8. In tabulating mechanism, a stop comprising a body portion, spaced ribs projecting from one side thereof, a tongue projecting from the opposite side thereof, and a spring clip mounted on said stop.

9. In tabulating mechanism, a stop having inclined ends, and a spring clip mounted on the stop and formed with ends to bear against the inclined ends of said stop and thereby hold the clip on the stop.

10. In tabulating mechanism, a stop formed with a tongue projecting therefrom, and a spring clip having an opening through which said tongue extends and inturned ends to bear against the ends of the stop.

11. In tabulating mechanism, the combination with a rack bar, of a stop adjustable on said bar, and a spring clip mounted on said stop and engaging the ends of a rack tooth on the bar to hold the stop in position.

12. In tabulating mechanism, the combination with a rack bar having teeth with undercut ends, of a stop mounted thereon, and a spring clip mounted on the stop and having spring ends projecting inwardly at the ends of the stop in position to engage the undercut ends of a number of teeth on the rack bar.

13. In tabulating mechanism, the combination with a rack bar, of a stop having ribs projecting from one face thereof to engage between teeth on the rack bar, a tongue projecting from the stop in the opposite direction, and a spring clip mounted on the stop and having an opening through which said tongue projects, said clip having downturned ends to engage the ends of teeth on the rack bar.

14. In tabulating mechanism, the combination of a rack bar having teeth with outwardly flared ends, a stop adjustable on said rack bar, and a spring clamp having inwardly inclined ends to engage the flared ends of the rack teeth.

15. In tabulating mechanism, the combination of a rack bar rectangular in section, and formed with recesses or grooves extending along the corners thereof, and stops adjustable along said bar and provided with holding means extending into said grooves.

16. In tabulating mechanism, the combination of a supporting bar rectangular in section and formed with recesses or grooves extending along the corners thereof, and stops adjustable along said bar and provided with holding means extending into said grooves.

17. In tabulating mechanism, the combination of a rack bar having rack teeth on different faces thereof, bearing blocks in which the bar is journaled for rotation to positions to bring said faces selectively to operative position, an adjusting plate adjustably secured to one of said blocks and having a running connection with the rack bar permitting the rack bar to rotate, and an adjusting screw for adjusting said plate along said block while the rack bar is in any of said rotative positions and thereby adjusting the rack bar in the bearing blocks, said adjusting plate controlling the position of adjustment of the rack bar in the bearing blocks while the rack bar is in any of said rotative positions.

18. In tabulating mechanism, the combination of a rack bar having sets of rack teeth on different faces thereof, a block in which said bar is journaled for rotation to bring said sets of teeth selectively to operative position, an adjusting plate adjustably mounted on said block and having an end extending into position to engage between the teeth of a set when any set of teeth is in operative position, and means for adjusting said plate, in a direction to adjust the rack bar longitudinally in the block, said plate controlling the position of adjustment of the rack bar in the block while the rack bar is in any of said rotative positions.

19. In tabulating mechanism, the combination of a stop-supporting bar adapted to support a plurality of series of stops on different faces thereof, a series of indicating characters to indicate which set of stops is in operative position, and a second series of characters to designate the faces of the bar in which the stops are mounted.

20. In tabulating mechanism, the combination of a stop-carrying bar adapted to receive a set of stops on each face of the bar, a head on said bar rotatable therewith, and two sets of indicating characters on said head, each character of one series corresponding to a diametrically opposite character on the other series.

21. In tabulating mechanism, the combination with a rack bar provided with rack teeth on opposite faces thereof, of stops projecting from said faces and each adjustable to any position along the rack bar independently of the position of the stops on the opposite face of the rack bar.

22. In tabulating mechanism, the combination of a rack bar, stops adjustable thereon, and holding clips on the stops each engaging opposite ends of a rack tooth or teeth and thereby holding the stops on the rack bar.

23. In a tabulating mechanism, the combination of a rack bar having rack teeth on one face thereof, stops adjustable thereon, and movable in a direction perpendicular to said face out of position on the rack bar, and means on the stops to engage the ends of the rack teeth and thereby hold the stops in position on the said rack bar.

24. The combination with a rack bar having a row of rack teeth on each of its sides, of tabulator stops adjustable along each of said sides, the stops on each side being adjustable independently of the stops on the other sides to any position along the rack bar, whereby a stop on any side may be adjusted to the same plane with a stop or stops on the opposite or adjacent sides of the rack bar.

25. In a tabulating mechanism, the combination with a rack bar provided with sets of rack teeth on different sides thereof, of stops projecting from said sides and each adjustable to any position along the rack bar independently of the position of the stops on said other side of the rack bar.

26. The combination with a tabulating rack bar having rack teeth on one face thereof, of stops adjustable to different positions along said face and movable transversely to the plane of said face into and out of operative position on said face of the bar in which the stops enter interdental spaces in said face of the bar, and holding means to interlock with said teeth and thereby lock the stops in position on the bar, the stops being supported and locked in position independently of the other faces of the bar.

27. The combination with a tabulating rack bar having rack teeth on one face thereof, of stops adjustable to different positions along said face and movable transversely to the plane of said face into and out of position on said bar in which the stops enter interdental spaces on the bar, and spring holding clips on said stops engaging the ends of said teeth to hold the stops in position on the bar.

28. In tabulating mechanism, the combination of a rectangular rack bar, and adjustable stops on one face of the bar, said stops located wholly between the two diagonal planes in which lie the four longitudinal edges of the said bar.

29. In tabulating mechanism, the combination of a rectangular supporting bar, adjustable stops, and means to support some of said stops on each face of the bar, said stops each located wholly between the two diagonal planes in which lie the four longitudinal edges of the said bar.

30. In tabulating mechanism for typewriting machines, the combination with a stop-supporting bar, of stops projecting from different faces of the bar, the stops on one face being individually adjustable through letter-space intervals to any letter-space position along the bar independently of the position of the stops on said other face of the bar, said bar being mounted for rotation to selectively bring said faces with the stops thereon into position to coöperate with a counter-stop, and means to hold the bar in its different rotative positions.

31. In a tabulating mechanism for typewriting machines, the combination with a rack bar provided with sets of rack teeth on different faces thereof, said rack teeth arranged at letter-space intervals along the bar, of stops adjustable through letter-space intervals along said faces, means for securing the stops in their adjusted positions, each stop on either of said faces adjustable to any position along the bar independently of the positions of the stops on the other of said faces, said bar mounted for rotation to bring the stops of any face of the bar into position to coöperate with a counter-stop, means to rotate the bar, and means to hold the bar in any of said positions of rotations.

HOWARD L. WHITE.

Witnesses:
 TITUS H. IRONS,
 F. E. ALEXANDER.